United States Patent [19]

Nimmo et al.

[11] 4,227,197
[45] Oct. 7, 1980

[54] LOAD MOVING DEVICES

[75] Inventors: William M. Nimmo, East Kilbride, Scotland; Richard Jarrett, Leigh-on-Sea, England

[73] Assignee: The Marconi Company Limited, Chelmsford, England

[21] Appl. No.: 967,637

[22] Filed: Dec. 8, 1978

[30] Foreign Application Priority Data

Dec. 8, 1977 [GB] United Kingdom ............... 51236/77

[51] Int. Cl.² ............................................. H01Q 1/12
[52] U.S. Cl. ...................................... 343/878; 308/9; 308/170
[58] Field of Search ..................... 308/9, 170, DIG. 1, 308/5 R, 3 C, 3 R, 135; 343/878

[56] References Cited

U.S. PATENT DOCUMENTS

| 3,451,731 | 6/1969 | Weichsel | 308/170 |
| 3,910,650 | 10/1975 | Kraus | 308/9 |
| 4,076,339 | 2/1978 | Schrolucke | 308/DIG. 1 |

Primary Examiner—Lenard A. Footland
Attorney, Agent, or Firm—Diller, Ramik & Wight

[57] ABSTRACT

A load moving device consists of a base member which supports the load to be moved and slides over a surface over which the load is to be moved. A lubricant such as grease is introduced between the base member and the surface and in order to prevent a trail of grease being left when the load is moved a skirt is arranged to surround the base member. A seal is operative between the skirt member and said surface to prevent the passage of grease beyond the skirt and the surplus grease within the skirt is scavenged for re-use.

15 Claims, 7 Drawing Figures

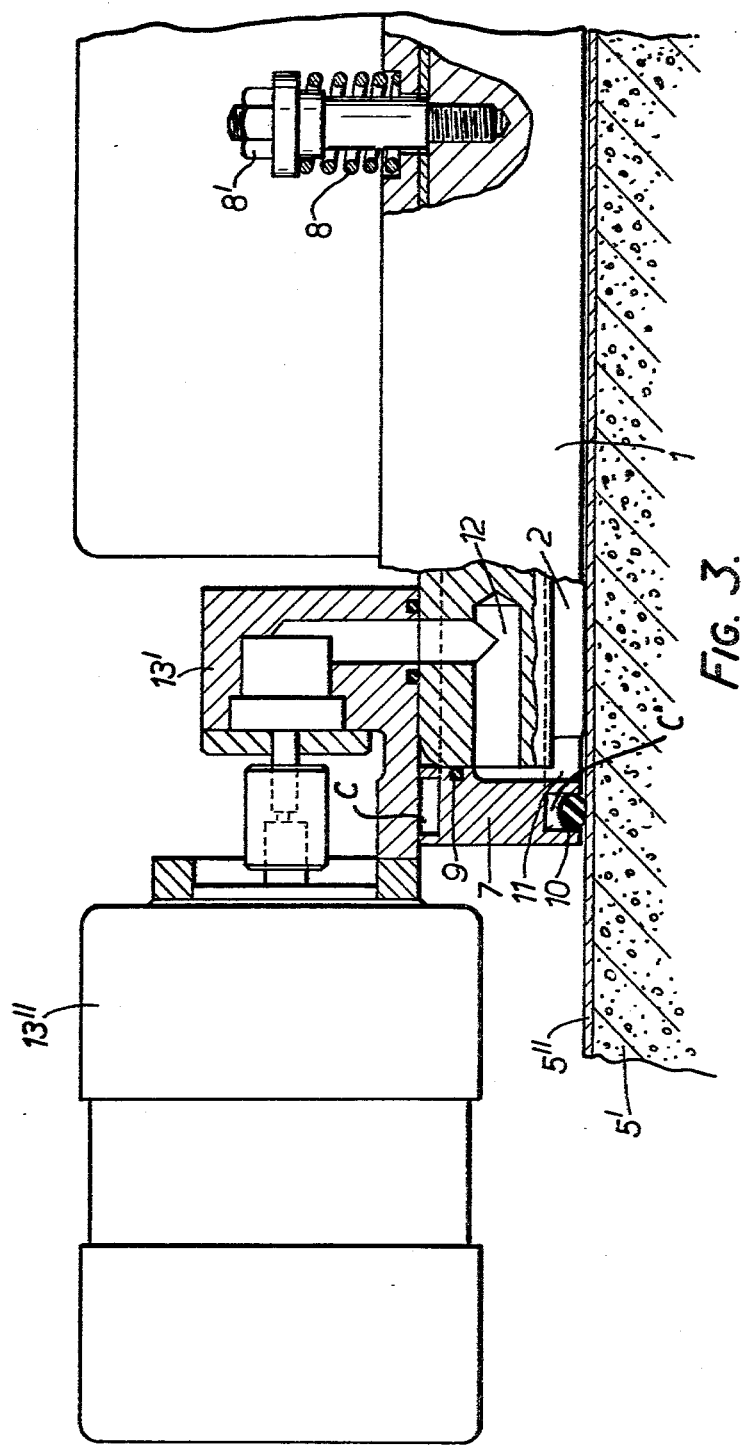

LOAD MOVING DEVICES

This invention relates to load moving devices in particular to load moving devices of the kind which comprise a base member provided to support at least part of a load to be moved and means for introducing a lubricant between said base member and a surface over which said load is to be moved. Examples of such devices are commercially available under the Trade Name "Floatpad" as covered by prior U.K. Pat. No. 1,471,113.

Figure 1:
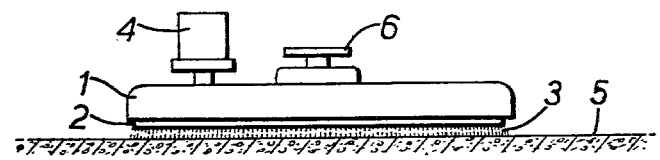

A typical load moving device of the kind referred to, as at present known, is illustrated in schematic manner in FIG. 1 of the accompanying drawings.

Essentially the device consists of a pad 1, circular in plan, having a layer 2 of elastomer on its underside, Internal galleries 1' (FIGS. 2, 4 and 6) within the pad 1 and patterns of feed orifices 1" (FIGS. 2, 4 and 6) in the elastomer layer 2 permit a lubricant 3 to be supplied under pressure from a reservoir 4 to the face of the elastomer layer 2 so that lubricating medium 3 is introduced between the elastomer layer 2 and a surface 5, often a specially laid surface of smooth nature, over which a load, not shown supported on a support plate 6 is to be moved. The support plate 6 is commonly universally mounted, as shown. Various examples of such devices are available including ones which involve a jacking action so that the support plate 6 may be brought up beneath and engage the load. Any given load may of course require a number of separate devices in order to provide satisfactory support during movement.

The lubricant 3 provided to enable the device, with its load, to be slid over the surface 5, is commonly grease and a disadvantage in the use of such devices as at present known is that a trail of grease tends to follow movement of the device. In many cases such devices will be used to move or position a heavy object such as an item of plant and whilst the aforementioned trail of grease is a nuisance, it is not too onerous a task to clear this up after moving and positioning of the item of plant. However, the disadvantage is particularly serious where the device is required to operate repeatedly in a given area.

One object of the present invention is to provide an improved device of the kind referred to in which the above mentioned disadvantage is reduced.

According to this invention a load moving device of the kind referred to comprises a skirt member surrounding said base member and having a seal operative between said skirt member and said surface and tending to prevent the passage of said lubricant beyond said skirt, and means for scavenging said lubricant in the region between said skirt member and said base member.

As known per se, commonly said base member will be provided with a layer of elastomer on its underside which layer of elastomer has a plurality of feed orifices co-operating with internal galleries within said base member by means of which lubricant may be introduced between the surface of said layer and said surface over which said device is to be moved.

Said skirt member, or said seal independent of said skirt member, may be hydraulically (liquid or gas) urged towards said surface.

Preferably said skirt member is resiliently mounted with respect to said base member, the resilience being such as to urge said skirt member towards said surface, and means are provided for effecting a seal between relatively moving surfaces of said base member and said skirt member.

Preferably means are provided for returning lubricant scavenged by said scavenging means to a reservoir of said lubricant provided to supply lubricant for introduction between said base member and said surface.

Preferably said lubricant is grease.

Preferably said seal tending to prevent the passage of said lubricant beyond said skirt member comprises an O-ring located in an underside of said skirt member facing said surface.

Said means for resiliently mounting said skirt member with respect to said base member may comprise a coil or disc compression spring in which case, preferably means are provided for adjusting the loading thereof. In a modification, however, the means for resiliently mounting said skirt member with respect to the base member comprises a preloaded resilient plate supporting said skirt member from said base member.

Where, as will normally be the case, said base member is circular in plan, said skirt member and said preloaded plate, where provided, are annular in plan.

Because of the "cleanliness" of the device provided by the present invention, this lends itself readily to applications which would normally be fulfilled by wheeled devices, such as for example the supporting bogie structure of a scanning radio antenna arrangement and according to a feature of this invention a scanning radio antenna is provided which is supported for rotational movement, at least in part, by a device of the kind referred to and as described above.

Preferably at least one such device is provided to support said antenna outside of the centre of rotation thereof, there being provided a smooth track over which said device may move.

Preferably said last mentioned smooth track is provided by a layer of stainless steel.

Figure 2:
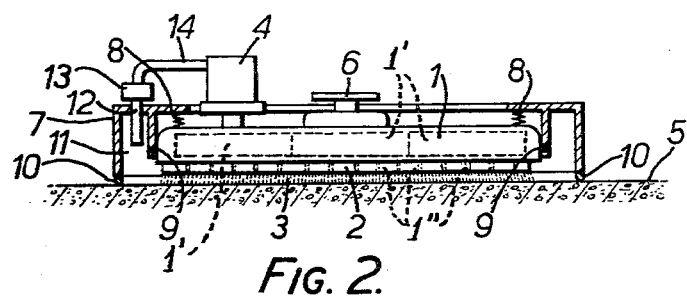
Figure 7:
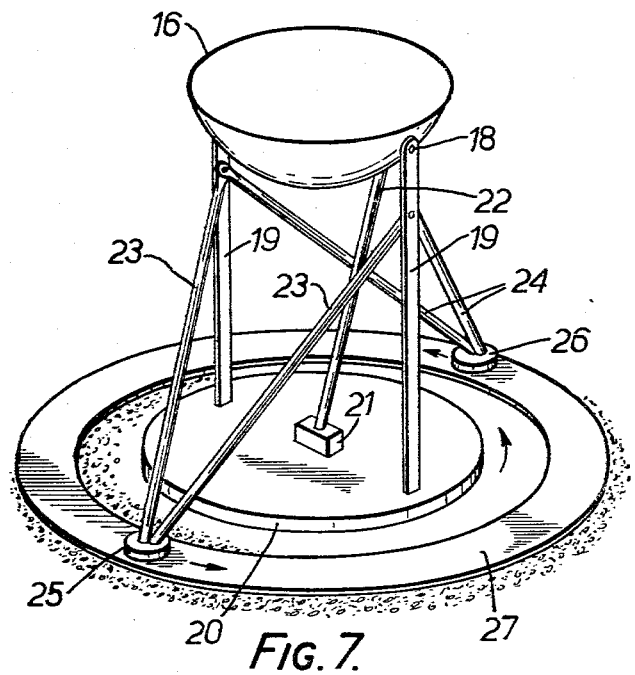
Figure 4:
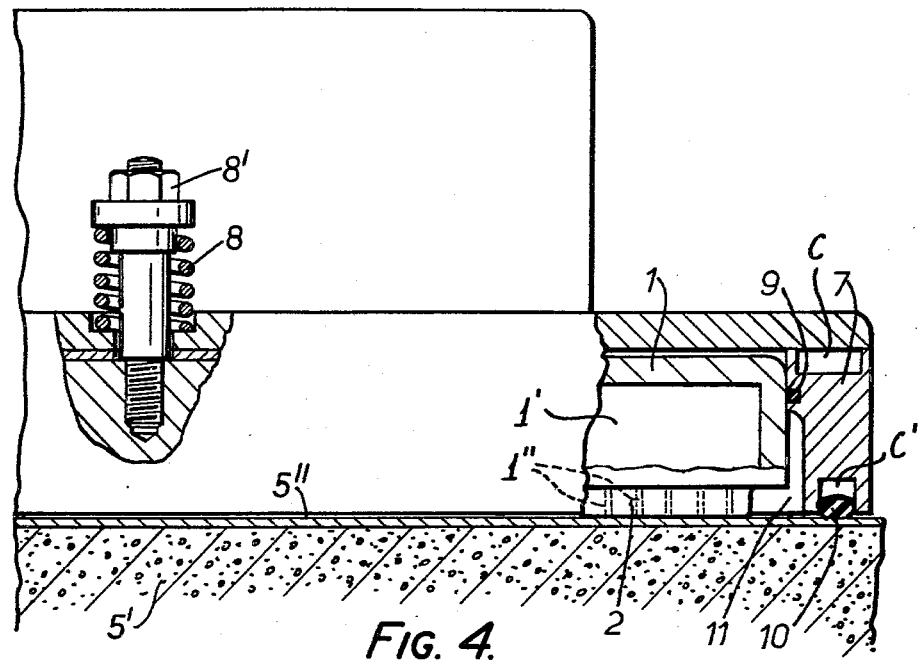
Figure 6:
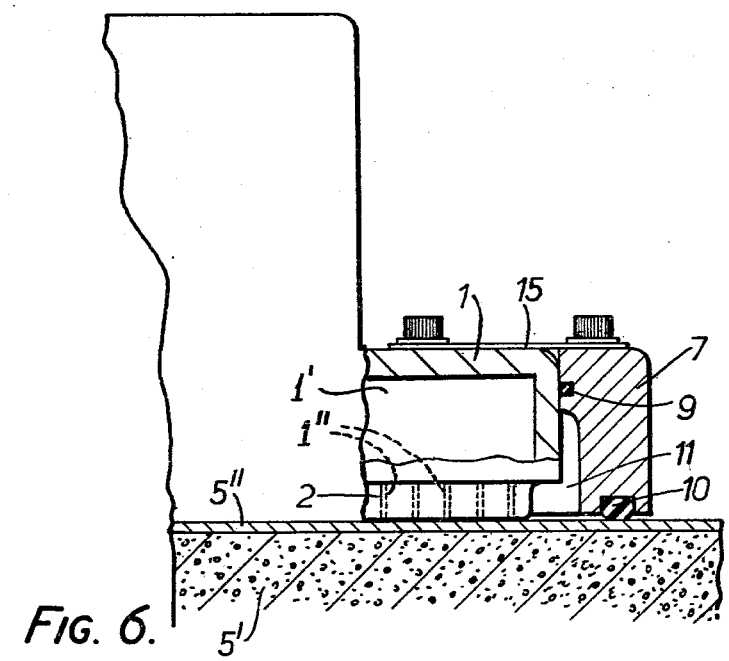
Figure 5:
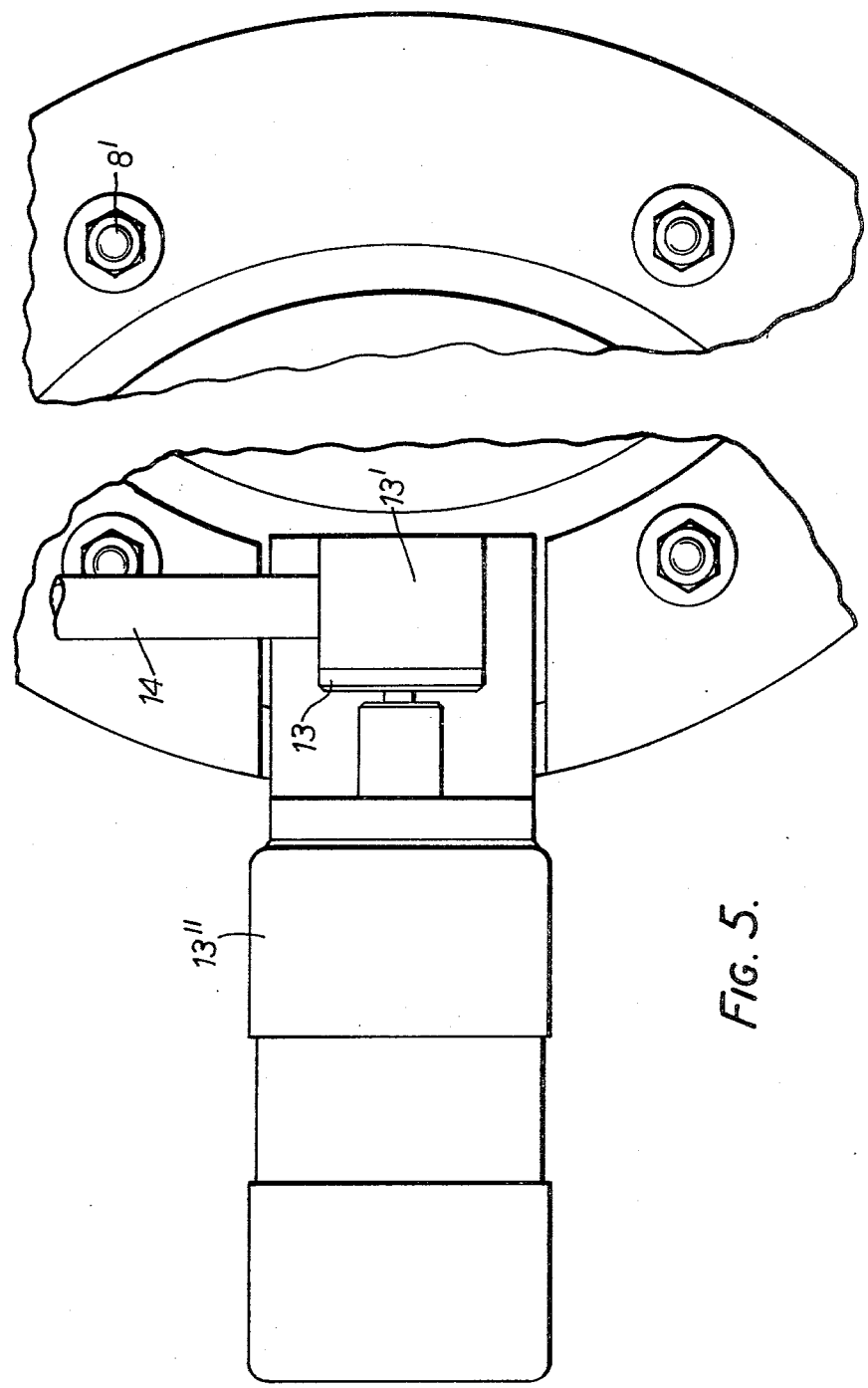

The invention is illustrated in and further described with reference to FIGS. 2 to 7 of the accompanying drawings of which, FIG. 2 illustrates in schematic manner one device of the kind referred to and in accordance with the present invention, FIGS. 3 and 4 are respectively left and right hand portions of a view in elevation, partly sectioned, of one practical device of the kind referred to and in accordance with the present invention, FIG. 5 is a part broken away plan view of the device of FIGS. 3 and 4, FIG. 6 illustrates a modification and FIG. 7 is a highly schematic perspective view of a scanning radio antenna system in accordance with the present invention.

In all Figures like references are used for like parts.

Referring to FIG. 2, it will be seen that the device illustrated therein is similar in many respects to the device illustrated in FIG. 1. However, an annular skirt member 7 is provided to surround the pad 1 and extend beyond the base of the pad 1 towards the surface 5. The skirt member 7 is resiliently mounted with respect to the pad 1 as represented by the springs 8 with the resilience such as to urge the skirt member 7 towards the surface 5.

As represented at 9, the skirt member 7 is sealed, by means of an O-ring, to the sides of the pad 1. The underside of the skirt member 7 is also provided with an O-ring as represented at 10, which tends to prevent the passage of the lubricant 3, in this case grease, beyond the skirt member 7, despite the movement of the device across the surface 5.

By virtue of the seals 9 and 10 a volume of space 11 bounded by the pad 1 with its elastomer layer 2, the skirt member 7 and the surface 5, is, for practical purposes closed. Into this space 11 projects the inlet 12 of a peristaltic or gerotor type pump unit 13, which, by means of manifold 14, returns grease scavenged from the space 11, to the reservoir 4.

Referring to FIGS. 3, 4 and 5, the practical device illustrated thereby will it is felt be largely self-explanatory in view of the fact that like references are used for like parts in FIG. 2.

In FIGS. 3, 4 and 5, the pump unit referenced 13' is of the gerotor type, whilst the electric drive motor therefore is shown at 13". The reservoir 4 in FIG. 2 is not represented in FIGS. 3 to 5.

The surface 5 is shown as a reinforced concrete base 5', which is provided with a stainless steel surface 5" in order to afford an operating surface which is more level, smooth and flat than that which would be presented by the surface of the concrete 5' itself. The use of a surface such as stainless steel not only improves the efficiency of the sealing afforded by seal 10, but also prolongs the useful life of this. The resilient mounting of the skirt member 7 is in this example by means of a single, centrally located, coil compression spring 8, which is adjustable as to its loading by means of an adjusting nut 8'. In lieu of the compression spring 8, the skirt member 7 may be hydraulically (liquid or gas) urged toward the surface 5" by introducing a pressurized liquid or gas into an annual chamber C, and the seal 10 can be independently urged toward the surface 5" by similarly introducing a pressurized liquid or gas into an annular chamber C'.

Referring to FIG. 6, this embodiment is essentially similar to that shown in FIGS. 3 to 5 except that the single centrally located coil compression spring 8 is replaced by a preloaded thin annular plate 15. In this example the spring bias of the skirt member 7 is of course non-adjustable.

Referring to FIG. 7, this illustrates in highly schematic manner a scanning radio antenna in accordance with the present invention. A radio antenna dish 16 is pivotally mounted at 18 on supports 19 vertically extending from a rotatable pedestal 20. Also carried upon rotatable pedestal 20 is a jacking control 21 and a drive shaft 22 enabling the directivity of the reflector 16 to be adjusted in the elevation plane.

Lateral support for the structure is afforded by legs 23 on one side and legs 24 on the other side. In a conventional design the legs 23 and 24 would be attached at their ends remote from the dish 16 to bogie wheeled carriages capable of travelling around a railed circuit as the pedestal 20 rotated in the horizontal plane. In accordance with the present invention, however, the ends of the legs 23 and 24 are supported upon devices of the kind referred to and as described above with reference to FIGS. 2 to 5 or FIG. 6. The devices supporting legs 23 and 24 are represented at 25 and 26 respectively.

Surrounding the pedestal 20 is an annular track 27 around which the devices 25 and 26 travel. This annular track is formed of stainless steel upon a base of concrete.

In FIG. 7 it is assumed that the devices 25 and 26 each have an individual reservoir of grease. In this application however, and in other applications where more than one device of the kind referred to is utilised to support and move a given load, the reservoir of grease may be common.

We claim:

1. A load moving device including a base member provided to support at least part of a load to be moved; means for introducing a lubricant between said base member and a surface over which said load is to be moved; a skirt member surrounding said base member and having a seal operative between said skirt member and said surface and tending to prevent the passage of said lubricant beyond said skirt, and means for scavenging said lubricant in the region between said skirt member and said base member.

2. A device as claimed in claim 1 and wherein said base member is provided with a layer of elastomer on its underside which layer of elastomer has a plurality of feed orifices co-operating with internal galleries within said base member by means of which lubricant can be introduced between the surface of said layer and said surface over which said device is to be moved.

3. A device as claimed in claim 1 and wherein said skirt member is hydraulically urged towards said surface.

4. A device as claimed in claim 1 and wherein said seal member independently of said skirt member is hydraulically urged towards said surface.

5. A device as claimed in claim 1 and wherein said skirt member is resiliently mounted with respect to said base member, the resilience being such as to urge said skirt member towards said surface, and means are provided for effecting a seal between relatively moving surfaces of said base member and said skirt member.

6. A device as claimed in claim 1 and wherein means are provided for returning lubricant scavenged by said scavenging means to a reservoir of said lubricant provided to supply lubricant for introducing between said base member and said surface.

7. A device as claimed in claim 1 and wherein said lubricant is grease.

8. A device as claimed in claim 1 and wherein said seal tending to prevent the passage of said lubricant beyond said skirt member comprises an O-ring located in an underside of said skirt member facing said surface.

9. A device as claimed in claim 1 and wherein said skirt member is resiliently mounted with respect to its base member and wherein said means for resiliently mounting said skirt member with respect to said base member comprises a coil or disc compression spring.

10. A device as claimed in claim 9 and wherein means are provided for adjusting the loading of said compression spring.

11. A device as claimed in claim 1 and wherein said skirt member is resiliently mounted with respect to said base member and the means for resiliently mounting said skirt member with respect to the base member comprises a preloaded resilient plate supporting said skirt member from said base member.

12. A device as claimed in claim 1 wherein said base member is circular in plan, said skirt member and said preloaded plate, where provided, are annular in plan.

13. A scanning radio antenna supported for rotational movement, at least in part, by a device as claimed in any of the above claims.

14. A scanning radio antenna supported for rotational movement at least in part by a device as claimed in claim 1 provided to support said antenna outside of the centre of rotation thereof, there being provided a smooth track over which said device may move.

15. An arrangement as claimed in claim 14 and wherein said last mentioned smooth track is provided by a layer of stainless steel.

* * * * *